Feb. 22, 1966  W. F. BROSKE ET AL  3,235,944
METHOD OF MAKING AN ELECTRICAL
CONNECTION TO A STRANDED CABLE
Filed Feb. 9, 1962  3 Sheets-Sheet 1
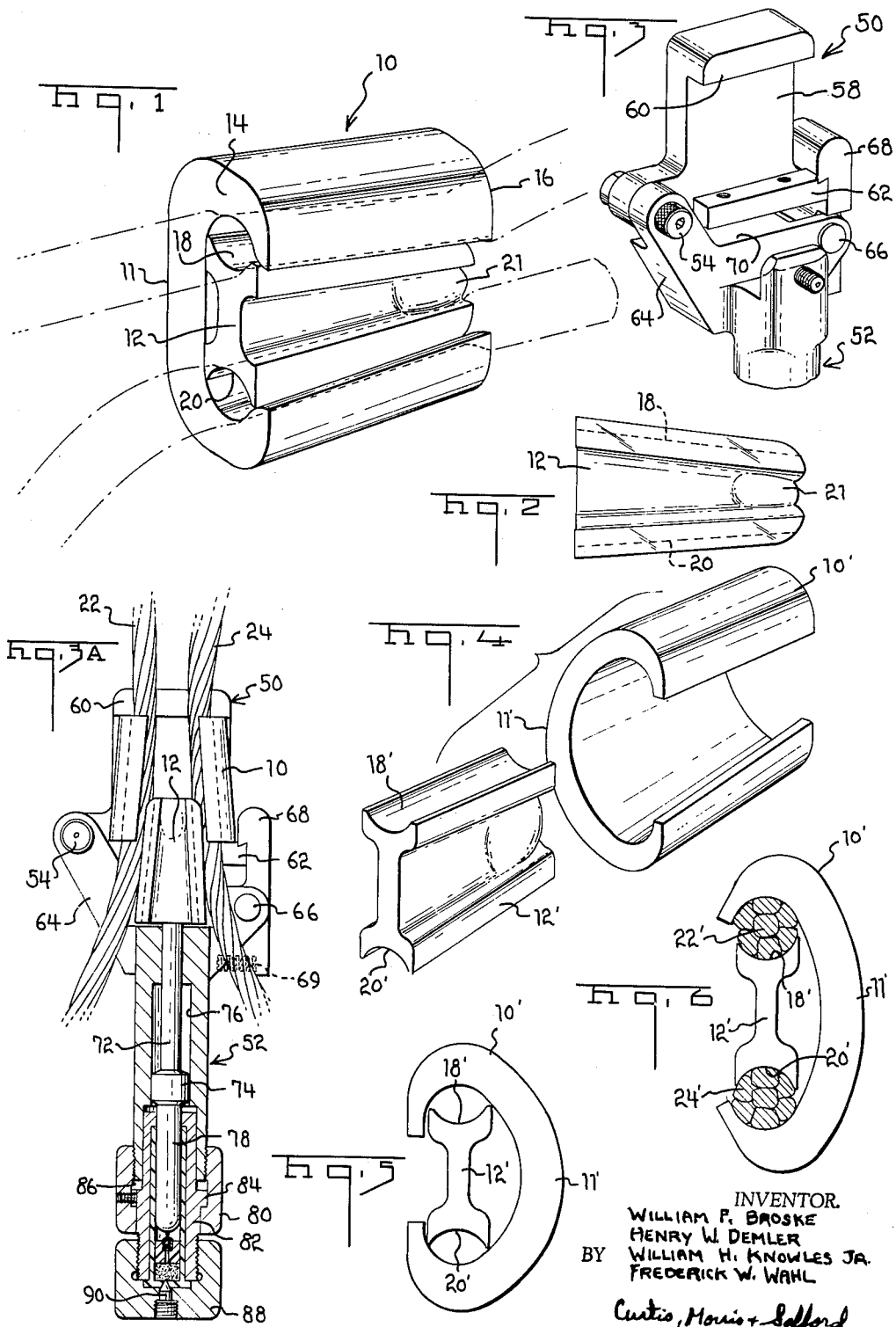
INVENTOR.
WILLIAM F. BROSKE
HENRY W. DEMLER
BY WILLIAM H. KNOWLES JR.
FREDERICK W. WAHL
Curtis, Morris + Safford

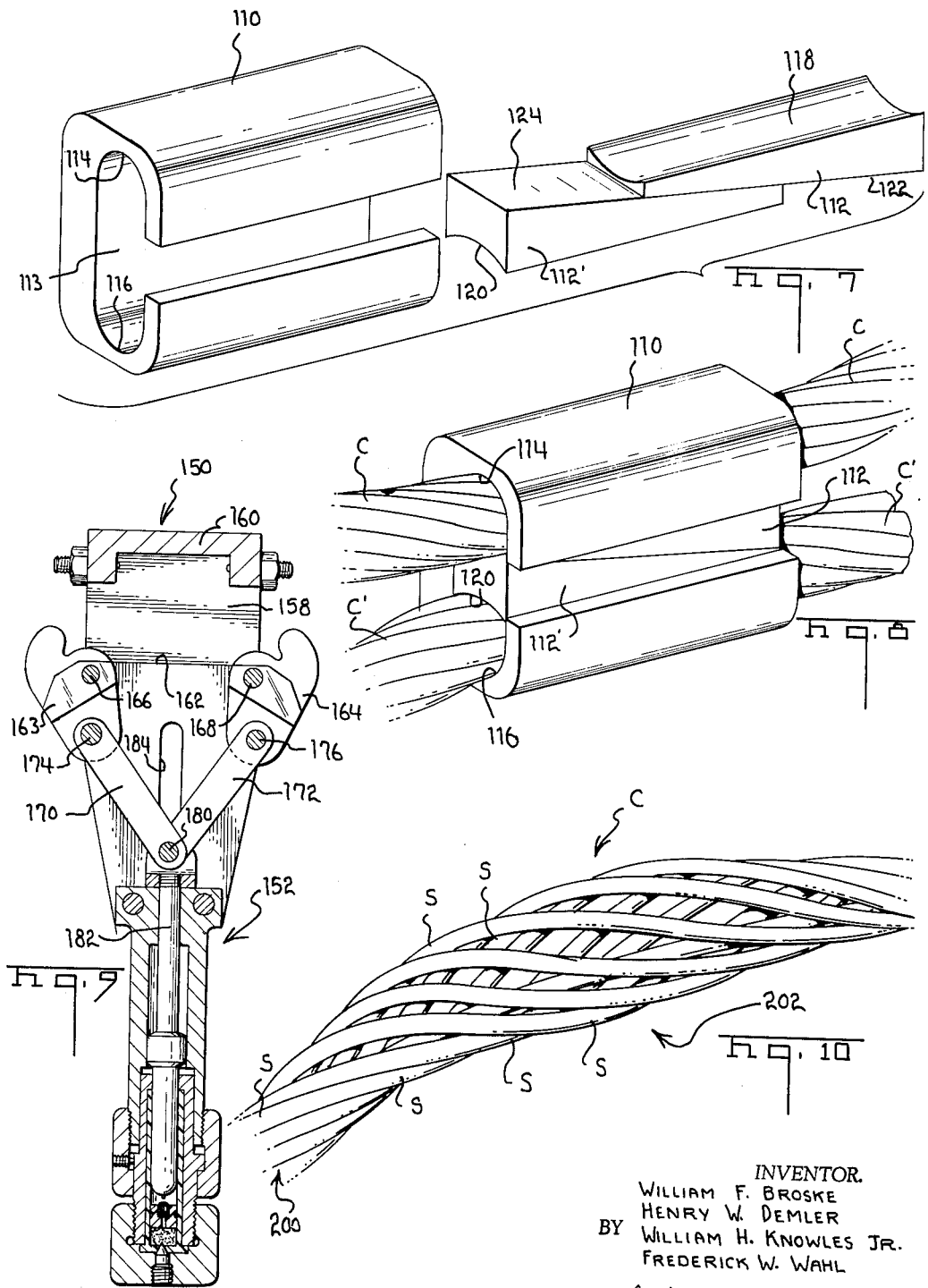

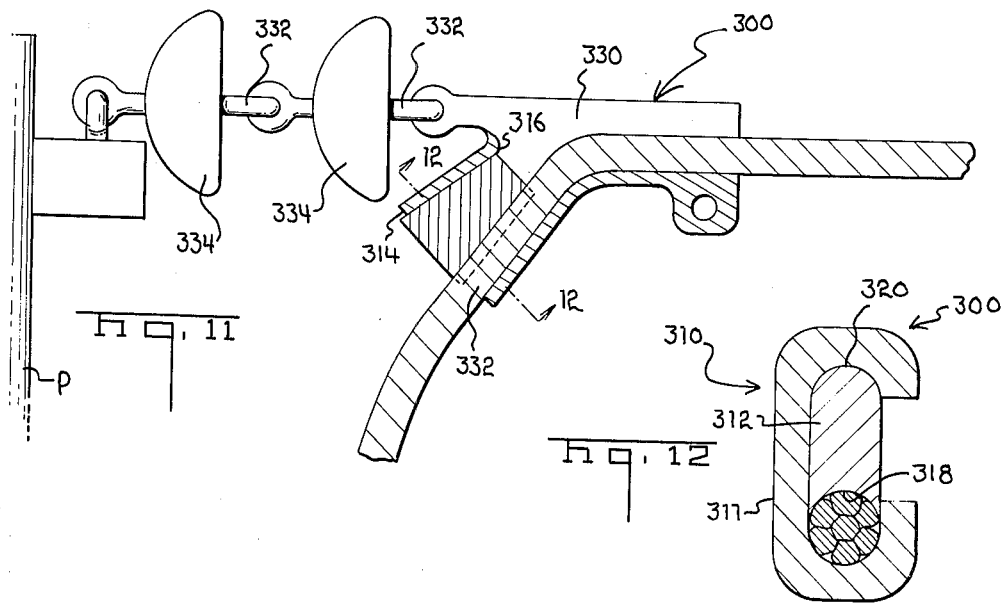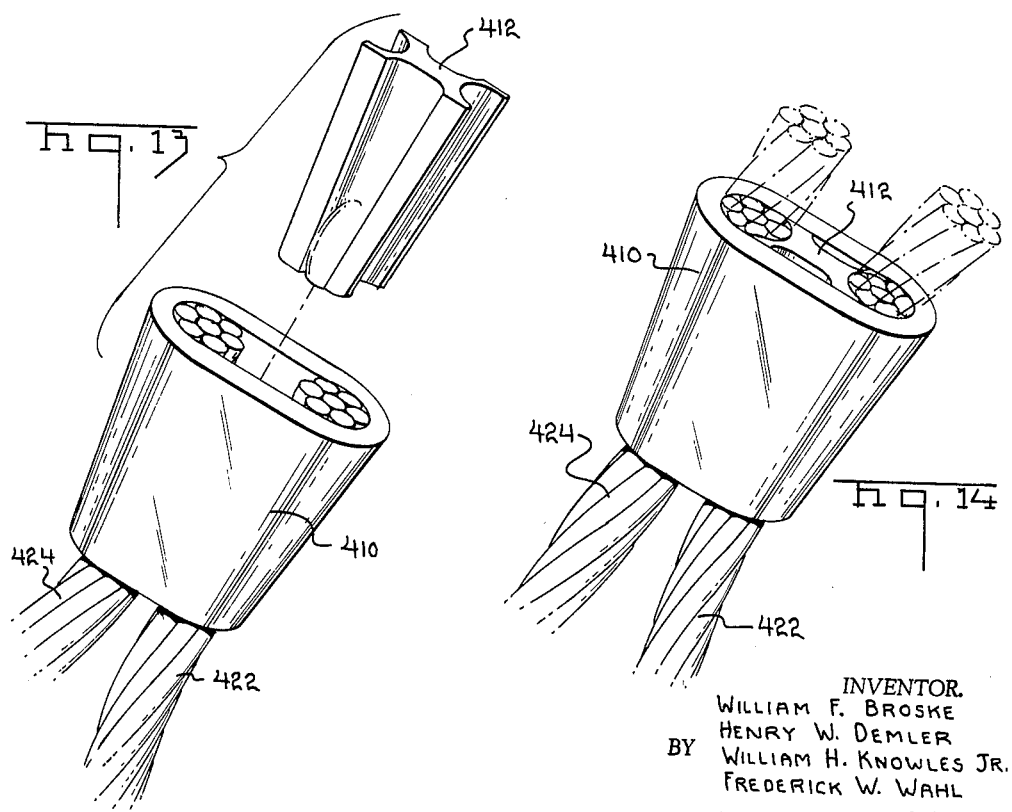

United States Patent Office 3,235,944
Patented Feb. 22, 1966

3,235,944
METHOD OF MAKING AN ELECTRICAL
CONNECTION TO A STRANDED CABLE
William F. Broske, Camp Hill, Henry W. Demler,
Lebanon, William H. Knowles, Jr., Berwyn, and
Frederick W. Wahl, West Chester, Pa., assignors to
AMP Incorporated, Harrisburg, Pa.
Filed Feb. 9, 1962, Ser. No. 172,183
2 Claims. (Cl. 29—155.5)

In the art of applying electrical connectors onto conductors, it is frequently necessary to apply such connector intermediate the ends of the conductor. It has also been found necessary to apply connectors of large sizes in areas where auxiliary power is not available, and heavy, cumbersome hydraulic tools cannot be used.

It is an object of this invention to provide a connection between a pair of wires which may be slipped over either or both of the wires at any point on the wire.

It is also an object of this invention to provide a means for securing such wires together, whereby a tight, cold-forged connection is made on large-sized wires efficiently and without the use of auxiliary power. It is also an object of this invention to permit the making of such a connection in areas and under circumstances where the size of the device making the connection must be kept as small as possible.

It is also an object of this invention to provide a method for effecting such a connection which provides a strong electrical joint having high conductivity.

Furthermore, it is an object of this invention to provide a wedge-type connector for joining stranded wires. It has been discovered that the use of this type of connection causes nonuniform, longitudinal movement of the strands which results in separation or splaying of the strands of the wire, known in the trade as "bird caging." This phenomenon is to be avoided since it permits debris, moisture, salt spray, atmospheric gasses, etc., to lodge in the conductor and promote corrosion. Also, on insulated wires it tends to rupture the insulation. It is also an object of this invention to prevent "bird caging" by a high rate of forming which effects the connection before "bird caging" can develop.

Other objects and attainments of the present invention will become apparent to those skilled in the art upon a reading of the following detailed description when taken in conjunction with the drawings in which there are shown and described illustrative embodiments of the invention; it is to be understood, however, that these embodiments are not intended to be exhaustive nor limiting of the invention but are given for purposes of illustration in order that others skilled in the art may fully understand the invention and the principles thereof and the manner of applying it in practical use so that they may modify it in various forms, each as may be best suited to the conditions of a particular use.

In the drawings:

FIGURE 1 is a perspective view of a connector embodying the principles of this invention;

FIGURE 2 is a planar view of the wedge;

FIGURE 3 is a perspective view of a tool for applying the connector to the conductor;

FIGURE 3A is a sectional view of the tool illustrated in FIGURE 3;

FIGURE 4 is an exploded, perspective view of another connector embodying the principles of this invention;

FIGURE 5 is an end view of the device illustrated in FIGURE 4;

FIGURE 6 is a view of the device shown in FIGURE 5, applied to a pair of conductors;

FIGURE 7 is an exploded, perspective view of another connector embodying the principles of this invention;

FIGURE 8 is a perspective view of the device of FIGURE 7 secured to a pair of conductors;

FIGURE 9 is a device for applying the connector shown in FIGURES 7 and 8 to a pair of conductors;

FIGURE 10 is a stranded conductor illustrating the phenomenon known as "bird caging";

FIGURE 11 is another embodiment of a connector employing the principles of this invention;

FIGURE 12 is a view taken through plane 12—12 of FIGURE 11;

FIGURE 13 is an exploded perspective view of yet another embodiment of a connector employing the principles of this invention; and FIGURE 14 is a view similar to FIGURE 13 showing the connector assembled onto a plurality of conductors.

As shown in FIGURE 1, a preferred embodiment includes a two-piece assembly comprised of a tubular outer shell 10, which in the preferment is substantially C-shaped in cross-section. The shell 10 has a straight back portion 11, and an I-shaped inner wedge member 12. The C-shaped shell tapers from a section 14 at one end, which has a greater cross-sectional periphery than the other end 16.

The wedge member 12 is I-shaped and has a pair of concave, arcuate surfaces 18 and 20 on opposite ends thereof. The wedge member is tapered from one end to the other in the same manner as the outside shell. This may be accomplished by making these straight originally, and compressing one end thereof to form a bulge 21 in the I-shaped section. Making the section I-shaped permits the forming of the bulge section more easily. Thus the taper on the inside surface of the C-shaped member corresponds with the taper on the arcuate members 18 and 20.

As shown in FIGURE 3A, conductor 22 is disposed between the surface 18 and the inside bight of the C-shaped member 10, and a second conductor 24 is disposed between the arcuate surface 20 on the opposite side of the C-shaped member 10.

With the conductors in this position, the wedge 12 is driven longitudinally relative to the C-shaped member until it is coextensive therewith, as shown in FIGURE 1.

The embodiment shown in FIGURES 4–6 is similar to that shown in FIGURES 1 and 2. A tubular member comprised of a C-shaped tapered shell 10' is adapted to receive an I-shaped tapered wedge member 12' with a pair of opposite arcuate surfaces 18' and 20'. The distribution from the prior embodiment is that the back portion 11' of the shell 10' is arcuate rather than straight.

Again a pair of conductors 22' and 24' (FIGURE 6) are adapted to be inserted between the surfaces 18' and 20', respectively, and the corresponding inner surfaces of the shell 10' and the wedge are driven in place to effect the crimped connection by reducing the radius of the arcuate section 11'.

The advantage of this construction is that a considerably larger range of wire sizes may be accommodated without changing shell 10' or wedge 12'. Since the shell 10' is capable of expanding through flattening the arc 11', the diameter of the wire controls their expansion. Furthermore, the shell 10' has a tendency to return to its original shape which results in a residual pressure being applied to the conductor after the connection is made.

A tool suitable for applying either of the previously described connectors is illustrated in FIGURES 3 and 3A. A head member 50 is pivoted to a cylindrical body member 52 by a pin 54. A cap 88 is threadedly secured to the other end of the body member 52.

Referring again to the head member 50, a connector-supporting surface 58 has a flange 60 at one end thereof.

Also secured to this surface is a pin 62 which projects from the head member to form a latch.

The body member has an arm 64 extending therefrom and the pin 54 pivots the head 50 to the body member 52. The opposite side of the body member has a second pivot pin 66 which pivotally secures a hook 68 thereto. The hook is spring-loaded in a counter-clockwise direction as seen in FIGURE 3A. It is observed that the hook 68 cooperates with the pin 62 to latch the head in closed position; however, during the locking cycle, the hook 68 can be depressed against the action of a spring 69 to unlatch the head member.

The body member 52 also has a shelf 70 which is coextensive with the inner surface of the flange 60. As shown in FIGURE 3A, the flange 60 and the pin 62 cooperate to retain the outer shell of the connector therebetween. The body member 52 is essentially cylindrical and has a ram 72 longitudinally disposed therein. The free end of the ram projects from the cylinder at the base of the arm 64. As shown in FIGURE 3A, the free end of the ram 72 is adapted to bear against the wedge 12 or 12' to drive it longitudinally into the shell 10 or 10' and secure the conductors thereto.

A piston 74 is secured to the ram 72 and is adapted to ride in a chamber 76 within the cylindrical body member 52.

One end of the ram 72 is secured to the piston, and at the other side of the piston a firing ram 78 is attached. The outer surface of the body member 52 has a collar 80 secured thereto. A tubular member 82 is slidable within the cylinder 52 and has a spline 84 disposed between the end of the cylinder 52 and the inner cylinder 86 on the collar 80. The spacing between the shoulder 86 and the end of the cylinder 52 permits longitudinal motion of the tubular member 82. Also, as shown in FIGURE 3A, the firing ram 78 projects down into the tubular member 82.

A cap 88 is secured to the free end of the tubular member 82. A plastic cartridge containing explosive material (described in Patent No. 3,007,409) may be inserted into the tubular member 82 with the firing piston projecting into the cartridge. The outer end of the tubular member 82 supports the head of the cartridge, and a prong 90 on the inner end of the head permits release of escaped gasses (described in application Serial No. 164,756, now Patent No. 3,171,224).

*Operation.*—When it is desired to secure a wedge-type connector, as shown in FIGURES 1 and 4, to a pair of conductors, the hook 68 is released from the pin 62 and the head 50 is pivoted into open position. The conductor shell is inserted into the head surface 58 with the conductors inserted into the appropriate positions in the shell. The wedge 12 is placed on the body member 52 in juxtaposiiton to the ram 72. The head member 50 is then rotated to its closed position and the hook 68 snaps closed over the pin 62. In this relationship, the wedge projects slightly into the connector shell. The cap 88 is unthreaded from the tubular member 82 and a cartridge inserted into position. The cap is then threaded in place to secure the cartridge in firing position. A sharp blow is then applied to the cap 88 which causes it to move upwardly detonating the cartridge against the firing ram 78. Explosion of the powder charge drives the ram 72 forwardly and actuates the driving ram 72 against the wedge 12. This drives the wedge into connector-forming position within the C-shaped shell 10. The tool may then be released and the cartridge removed from further operation.

Directing attention to FIGURES 7 and 8 disclosing another embodiment of a connector employing the principles of this invention, the device comprises a tubular member 110 which is substantially C-shaped, and a pair of wedge members 112 and 112' which are designed to fit within the center section 113 of the C-shaped member 110. The internal section 113 of the C-shaped member 110 has a pair of opposed, internal arcuate surfaces 114 and 116 formed by the bight of the C-shaped portion.

The wedge member 112 has an upper arcuate surface 118, and the other wedge member 112' has a similar arcuate lower surface 120. The surface of the wedge member 112, which is opposite to the arcuate surface 118, is a tapered planar surface 122. The other wedge member 112' also has a similar planar surface 124 that is tapered in the opposite direction from the surface 122. The two wedge member 112 and 112' may be lightly bonded together, as shown in FIGURE 7, for ease in assembly. Any suitable adhesive may be used that will retain them in this position without interfering with lateral motion of the wedges.

The connector of FIGURE 7 may be assembled with the wedges 112 and 112' disposed centrally of the C-shaped member in the opening 113. With the wedges in extended position, a pair of conductors C and C' may be inserted in the upper and lower bight portions 114 and 116 of the connector 110. The wedges 112 and 112' are inserted between the conductors C and C'. A suitable device (such as shown in FIGURE 9) may be used to drive the wedges 112 and 112' laterally toward each other, causing the planar surfaces 124 and 122 to drive the arcuate surfaces 118 and 120 against the corresponding surfaces 114 and 116 in the shell 110. This causes the conductors C and C' to be wedged tightly within the shell 110 and retained therein by the wedge members 112 and 112'.

A tool for making the connections of FIGURE 8 is illustrated in FIGURE 9, and includes a head member, generally designated 150, and a body member designated at 152. The structure for actuating the tool is identical with the device set forth and described in FIGURES 3 and 3A, and the description will not be repeated. The head of the tool has a connector-receiving surface 158 with a flange 160 projecting from one end thereof. An opposing shelf 162 cooperates with the flange 160 to retain the connector 110 therein.

The body member 152 may be slotted or comprise a pair of plates which are bolted together, but spaced from each other to retain linkage members. A pair of driving members 163 and 164 are pivoted respectively at 166 and 168 to the body member 152. The member 163 is adapted to bear against the free end of wedge member 112', while the member 164 is similarly adapted to bear against the free end of the wedge member 112. Each of these members 162 and 164 are secured to a link 170 and 172 respectively through pins 174 and 176. The links 170 and 172 are commonly pivoted at 180 to a ram 182 which is associated with the actuating means in the same manner as the embodiment shown in FIGURES 3 and 3A. The pin 180 is adapted to slide longitudinally in an aperture 184. Lateral movement of the pin 180 in the aperture 184 causes the links 170 and 172 to rotate the driving means 163 and 164 about pivot pins 166 and 168.

When it is desired to make a connection of the type shown in FIGURES 7 and 8 with the tool of FIGURE 9, the conductors C and C' are inserted within the shell 110 adjacent the inner surfaces 114 and 116. The wedges 112 and 112' are inserted within the conductors and the assembly is then placed in the tool, as shown in FIGURE 9, with the flange 160 and opposed surface 162 retaining the shell 110 in place.

A cartridge is inserted in the tool and exploded in the method described above with regard to FIGURES 3 and 3A. Longitudinal movement upwardly of the ram 182 drives the pin 180 upwardly, causing the links 170 and 172 to rotate the actuating members 163 and 164. The member 163 rotates clockwise, as shown in FIGURE 9, while the actuating means 164 rotates counter-clockwise. The actuating means 163 bears against the wedge 112' and drives it inwardly. Concurrently, the actuating means 164 operates against the free end of the wedge 112 and also drives it inwardly. The two wedges, 112 and 112', move inwardly, riding on their inclined planes, and are disposed laterally to the longitudinal axis of the connectors C and C' to tightly grip the conductors within the shell 110. As shown in FIGURE 10, a stranded conductor C comprises a plurality of strands S of conductive material, such as copper or aluminum. At one end of the conductor, designated at 200, the strands are tightly braided together in the desired fashion. When a connection is made with one end of the conductor, slow relative motion of a wedge-type member across the strands causes the strands to rotate relative to the fixed end, thus opening the strands as shown in the central section 202. This is the phenomenon known as "bird caging," described above, which is detrimental to proper use of a stranded conductor. In present-day usage when such "bird caging" occurs, it is common practice to fill the space between the strands with epoxy resin or some other suitable material to prevent entrance of moisture, corrosion, and other corrosion-inducing materials. Applicants have discovered that the use of an explosively-driven device, such as shown in FIGURES 3, 3A and 9, used in combination with a wedge-type connector causes practically instantaneous reforming of the conductor within the wedge-shaped member so that "bird caging" is virtually eliminated.

The embodiment illustrated in FIGURES 11 and 12 employs the same principles as the alternative embodiments shown in FIGURES 1, 4 and 7. The particular application is known as a "dead end" splice. The connector portion 300 of the splice is substantially C-shaped as shown in FIGURE 12. As in the other embodiments, a tubular outer shell 310 has a straight back portion adapted to receive a wedge member 312. The shell tapers from a larger cross-sectional portion at one end 314 to the smaller end 316.

The wedge 312 has a concave, arcuate surface 318 on one side which cooperates with a bight of the tubular member 310 (FIGURE 12). The opposed surface 320 of the wedge 312 is convex and cooperates with the opposed bight of the shell 310.

The remainder of the assembly illustrated in FIGURE 11 is standard, and is included in the drawings for clarity. The connector portion 300 may be secured to any standard, dead-end splice 330, which is secured to a pole P by links 332 through insulation 334.

A conductor 322 may be secured in the connector 310 in the manner described in the other embodiments. The convex arcuate surface 320 of the wedge 312 cooperates with the corresponding bight of the tubular shell 310 to lock the wedge in the shell, rather than to secure a second conductor therein, as depicted in the previously-described embodiments.

The embodiment illustrated in FIGURES 13 and 14 is also similar to the various previously-described devices. In this form, the shell 410 is continuous rather than being C-shaped. The wedge 412 is identical with the wedge 12 shown in FIGURE 1, described above. A pair of conductors 422 and 424 may be spliced in this same manner, as described in connection with the embodiments of FIGURE 1. The connector of FIGURES 13 and 14 may be used in applications where it is possible to thread the conductor into the connector. The C-shaped connectors may be used where it is necessary to tap into an intermediate portion of a conductor. Either the C-shaped shell or the continuous shell may be used with the various embodiments within the intent of the invention.

Changes in construction will occur to those skilled in the art and various apparently different modifications and embodiments may be made without departing from the scope of the invention. The matter set forth in the foregoing description and accompanying drawings is offered by way of illustration only. The actual scope of the invention is intended to be defined in the following claims when viewed in their proper perspective against the prior art.

We claim:
1. The method of forming an electrical connection between a plurality of stranded electrical conductors, and and a connector having a C-shaped shell member and a tapered wedge comprising the steps of inserting the conductors to be joined into the shell member, and placing the tapered wedge between the conductors, detonating an explosive charge to drive a ram at high velocity, directing the ram against the wedge so that it drives the wedge into the C-shaped shell member between the conductors at a sufficiently high velocity to permit inertia of said stranded conductors to be effective to prevent relative motion between the strands of said conductors, whereby they will be secured between the wedge and the C-shaped shell member without causing "bird caging" of the component strands.

2. The method of securing a pair of electrical conductors to a connector which comprises the steps of fixing a C-shaped connector in a tool to prevent displacement, inserting a pair of conductors at least one of which is stranded in the connector with a wedge between them, detonating an explosive to drive a relatively slidable captive ram at sufficiently high velocity against the wedge to force the wedge between the conductors at a sufficiently high velocity to permit inertia of the stranded conductor to be effective to prevent relative motion between the strands of said conductor whereby there will be intimate contact between the conductors, the connector and the wedge without "bird caging" the strands of the stranded conductor and limiting the travel of the wedge so that it is not driven out from between the conductors.

References Cited by the Examiner

UNITED STATES PATENTS

| | | | |
|---|---|---|---|
| 399,465 | 3/1889 | Bainbridge | 339—247 |
| 2,030,803 | 2/1936 | Temple | 140—113 |
| 2,106,724 | 2/1938 | Cope. | |
| 2,146,923 | 2/1939 | Wahlstrom. | |
| 2,801,400 | 7/1957 | Noirclerc | 339—247 |
| 2,930,113 | 3/1960 | Greco | 29—155.55 |
| 2,968,043 | 1/1961 | Demler | 1—44.5 X |
| 2,980,991 | 4/1961 | Frank | 29—203 |
| 3,010,184 | 11/1961 | Forney | 29—155.55 |
| 3,045,336 | 7/1962 | Northrop et al. | 29—203 |

WHITMORE A. WILTZ, *Primary Examiner.*

JOHN F. CAMPBELL, *Examiner.*